Oct. 19, 1937.  H. G. KELLER  2,096,431

VARIABLE SPEED TRANSMISSION

Filed Feb. 9, 1934  2 Sheets-Sheet 1

Inventor
Henry G. Keller
by Parker + Carter
Attorneys.

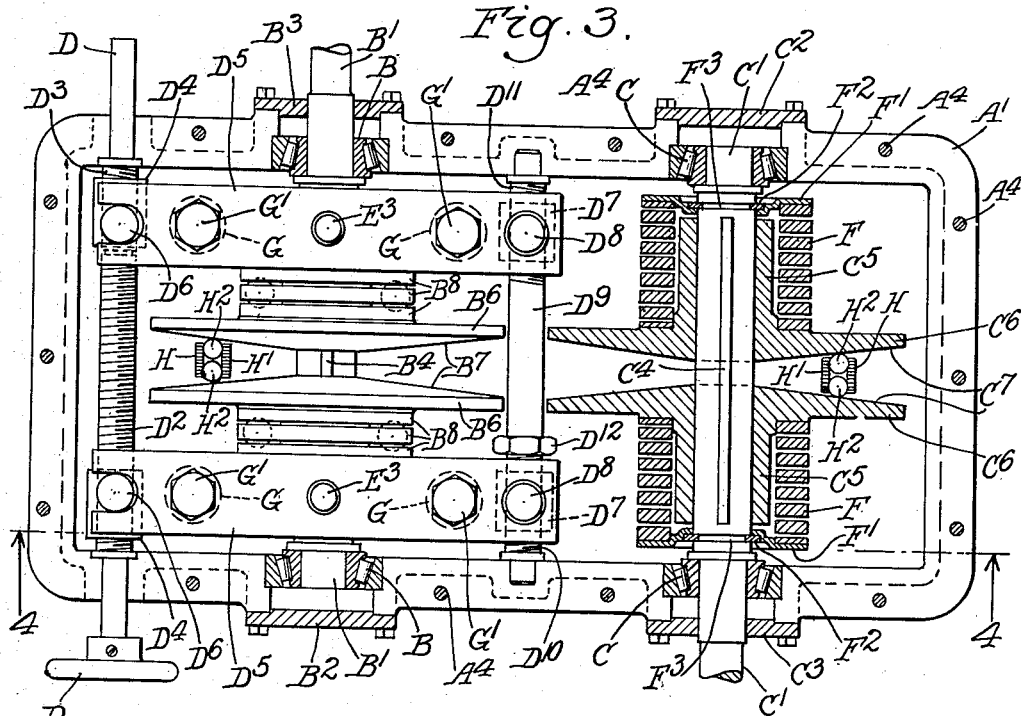

Patented Oct. 19, 1937

2,096,431

UNITED STATES PATENT OFFICE 2,096,431

VARIABLE SPEED TRANSMISSION

Henry G. Keller, Glenside, Pa., assignor to Link-Belt Company, Chicago, Ill., a corporation of Illinois Application February 9, 1934, Serial No. 710,401

8 Claims. (Cl. 74—230.17)

This invention relates to a variable speed transmission. In the particular form shown the transmission includes two pairs of pulleys and means for moving them toward and from each other. A flexible chain or belt is used and engages both pairs of pulleys. As the pulleys are moved toward and from each other, their effective diameter is varied. In transmissions of this general type it has heretofore been necessary to provide a belt tightener to take up slack in the belt and in general to provide against unsatisfactory looseness in the belt.

One of the objects of the present invention is to provide means for taking up the slack without the necessity of a belt tightener. Another object of the invention is, therefore, to provide an automatic chain adjuster which will automatically keep the chain adjusted at all times and for all positions of the pulleys. Another object is to provide in connection with such a transmission chain adjuster means to permit the occurrence of slip due to excessive overload.

Other objects will appear from time to time in the specification and claims.

The invention is illustrated more or less diagrammatically in the accompanying drawings, wherein:—

Figure 3 is a view generally similar to Figure 1, showing a modified form;

Figure 4 is a longitudinal vertical sectional view, taken at line 4—4 of Figure 3.

Like parts are designated by like characters throughout the specification and drawings.

Any suitable form of casing may be used. It is preferable to use a liquid tight casing and to have the transmission run in oil or other lubricant.

In the form here shown, the casing includes a lower portion A having a flange $A^1$ laterally extended and providing means for attaching the upper portion $A^2$ of the housing, which upper portion is preferably provided with a flange $A^3$, to contact the flange $A^1$. The flanges are perforated at suitable points to receive screws or other attaching means $A^4$ by which the housing portions are fastened together. The top of the upper casing section $A^2$ may be provided with an opening $A^5$ which is closed by a cover plate $A^6$ held in place by screws or other fastening means $A^7$.

The housing portions are shaped to receive a pair of antifriction bearings B, B. A shaft $B^1$ is supported in these bearings. $B^2$ is a cover plate and $B^3$ is a packing plate arranged about the shaft $B^1$ to prevent leakage of lubricant. The shaft $B^1$ is provided with a key $B^4$ which fastens a pair of inclined faced or generally conical pulleys to the shaft B. Each of these pulleys is provided with a shaft engaging and surrounding portion $B^5$ slidably mounted on the shaft and a chain engaging portion $B^6$ which, as shown, is preferably provided with an inclined and generally conical working face $B^7$. Antifriction bearings $B^8$ are mounted about the cylindrical portions $B^5$ of the pulleys and bear partially against the portions $B^6$.

The housing members are arranged to receive a pair of antifriction bearings C, C, within which a shaft $C^1$ is mounted for rotation. $C^2$ is a cover plate and $C^3$ is a packing plate arranged to prevent leakage of lubrication. A key $C^4$ is provided on the shaft $C^1$ to receive a pair of pulleys generally similar to the pulleys $B^6$. Each of them is provided with a cylindrical portion $C^5$ which engages the key $C^4$ and is slidable upon the shaft $C^1$. The pulleys are also provided with portions $C^6$ each of which is provided with an inclined or conical working face $C^7$. Antifriction bearings $C^8$ are mounted about the cylindrical portions $C^5$ of the pulleys and in part bear against the portions $C^6$.

Figure 1:
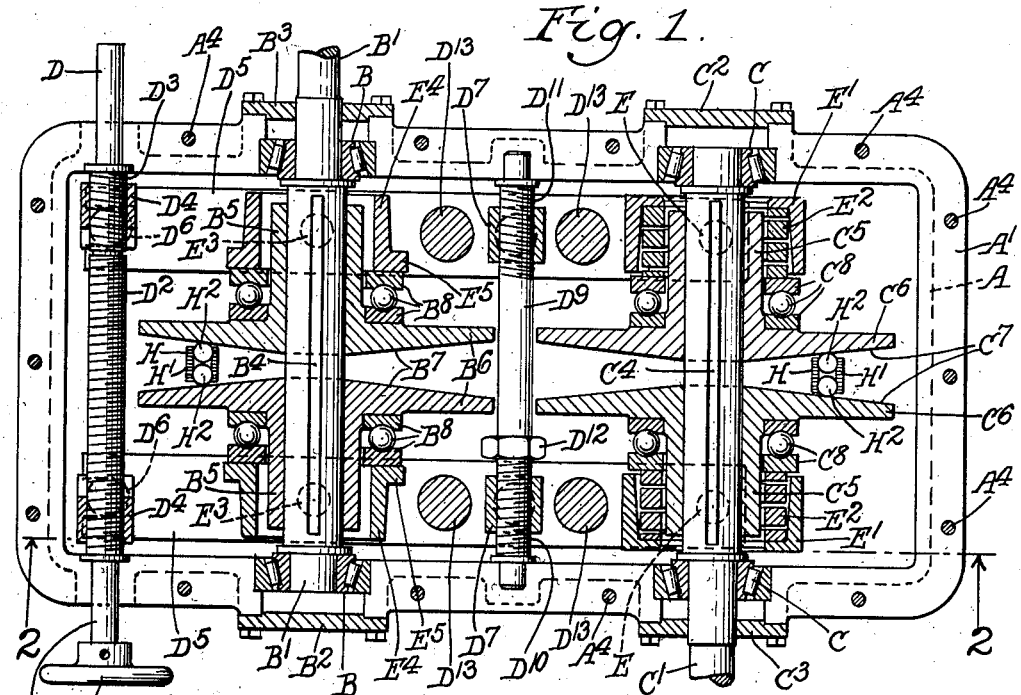
Figure 1 is a horizontal, longitudinal cross section, with some parts in elevation, showing one form of transmission.
Figure 2:
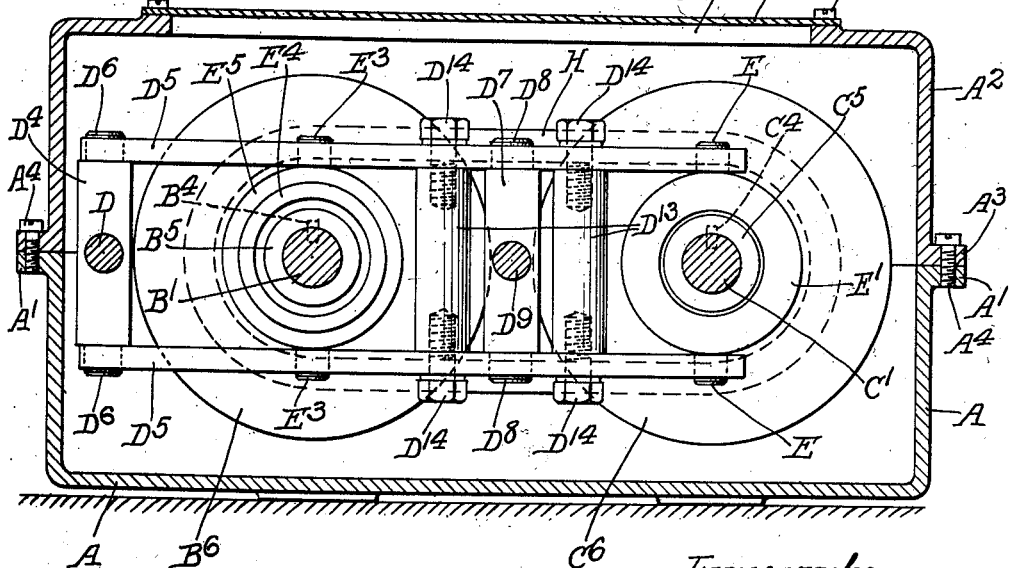
Figure 2 is a vertical longitudinal section of the casing, taken at line 2—2 of Figure 1, with some parts shown in elevation.

In the form shown in Figures 1 and 2, means are provided for moving the pulleys of each pair toward and from each other and this means is so arranged that as the pulleys of one pair move together the pulleys of the other pair move apart. The pulley adjusting means includes an adjusting shaft D, journaled in suitable bearings in the housing and provided with a handle or operating member $D^1$. The shaft is provided with two oppositely threaded portions $D^2$ and $D^3$, upon each of which is threaded a lever support $D^4$. Mounted at each end of each member $D^4$ are arms $D^5$ of composite pulley adjusting levers. These arms are engaged upon studs or rounded portions $D^6$ of the member $D^4$. The composite levers are fulcrumed upon supports $D^7$ provided at each end with studs or rounded portions $D^8$. The supports $D^7$ are received upon a shaft $D^9$ which is provided with oppositely threaded portions $D^{10}$ and $D^{11}$ and is mounted in suitable bearings in the housings. The shaft $D^9$ is provided with a nut or angularly shaped portion $D^{12}$ by means of which it may be rotated to adjust the position of the fulcrum members $D^7$. Spacing members $D^{13}$, $D^{13}$ are provided between the lever members $D^5$ and preferably on either side of the fulcrum member $D^7$. The lever members $D^5$ are fastened to the members $D^{13}$ by screws $D^{14}$.

Adjacent their free ends the lever members $D^5$ are perforated or otherwise shaped to receive studs E, E, two of which are formed upon each of two cup shaped members $E^1$. These cup shaped members surround the shaft $C^1$ and overlap a portion of the cylindrical sections $C^5$ of the pulleys $C^6$. Within each of the cups $E^1$ and bearing against the outer member of one of the antifriction bearings $C^8$ are coil springs $E^2$. Intermediate the members $D^4$ and $D^7$ the lever portions $D^5$ are perforated to receive studs or projections $E^3$, two of which are formed on each of two collars $E^4$ which surround the shaft $B^1$, portions of the cylindrical pulley sections $B^5$, each of which bears against the outer member of one of the antifriction bearings $B^8$. The collars $E^4$ may be provided with laterally extending flanges $E^5$ to increase their area of contact with the bearing members $B^8$.

In the form shown in Figures 3 and 4, the composite lever acts only upon one pair of pulleys. The other pair is held by springs and is moved in and out by the belt and not directly by any lever or any positive adjustment. The arrangement of shafts and pulleys upon them is the same in the two forms of the invention. In the form shown in Figures 3 and 4, F, F are coil springs positioned about the cylindrical sections $C^5$ and bearing against the pulleys $C^6$. At their opposite ends the springs bear against plates $F^1$ mounted about the shaft $C^1$. The plates are held in place by split rings $F^2$ which are fitted into grooves or notches $F^3$ cut in the shaft $C^1$.

The positive adjusting means of the form shown in Figures 3 and 4 is substantially one-half of that shown in Figures 1 and 2. It is as though the lever members $D^5$ had been cut off to the right of the fulcrum members $D^7$. There is thus upon each of the threaded sections of the shaft D a member $D^4$ provided at its upper ends with studs $D^6$ to receive the lever sections $D^5$. The lever sections are fulcrumed upon members $D^7$ one of which is threaded upon each of the threaded portions $D^{10}$ and $D^{11}$ of the shaft $D^9$. The members $D^5$ are perforated to receive the studs $E^3$ of the collars $E^4$. Since, however, the lever members $D^5$ do not extend appreciably beyond the fulcrum member $D^7$ the levers are spaced and fastened together intermediate their ends by members G, G, which are positioned between the lever members $D^5$ and one on each side of the shaft $B^1$ and fastened to the members $D^5$ by screws $G^1$. The arrangement of collars and bearings for contacting and moving the pulleys $B^6$ is the same as in the form shown in the earlier figures and need not again be described.

Many different forms of driving chain or belt may be used. As shown herewith, H is a chain which may be formed of links $H^1$ within which may be seated pulley contacting members $H^2$. The particular details of the chain need not be shown in full as they form no essential part of the present invention.

While I have herewith shown and described a practical operative device, nevertheless many changes might be made in the size, shape, number and disposition of parts without departing from the spirit of my invention and I wish, therefore, that my showing be taken as in a sense diagrammatic.

The use and operation of my invention are as follows:

In general, the transmission is to be used to give a variable speed in a power transmission. One shaft, for example, the shaft $B^1$, is a driving shaft and is connected with any suitable source of power by any means. In that case the shaft $C^1$ is the driven shaft and will be connected by pulleys or otherwise to some mechanism which it is desired to drive. To effect a change in speed, the shaft D is rotated by the handle $D^1$ and because the threaded portions of the shaft D are oppositely threaded, when the shaft is rotated one composite lever will move in one direction and the other composite lever will move in the opposite direction, so that one direction of rotation of the shaft D moves the levers apart and the opposite direction of rotation moves them together. In the form shown in Figures 1 and 2, since both pairs of pulleys are engaged by the levers, as one pair is moved outward the other is moved inward and vice versa. In the form shown in Figures 3 and 4, only one pair is moved positively, but the other pair accomplishes a corresponding and compensating movement which is permitted by the springs F. These springs tend normally to move the pulleys $C^6$, $C^6$ toward each other as far as possible, but permit the pulleys to be forced apart by the chain and thus permit compensating and corresponding movement in and out, when the pulleys $B^6$ are positively moved by the adjustment shown.

It will be seen that in both forms of the invention one pair of pulleys is provided with a yielding mounting in the form of compression springs which bear on each of the pulleys of the pair in question and serve automatically to keep the chain in proper adjustment. The springs force the pulleys inwardly and thus take up slack which might otherwise occur in the chain as the result of adjustment of the pulleys toward and from each other. In the form shown in Figures 1 and 2, where the pulleys of both pairs are adjusted positively toward and from each other, the springs are effective upon a single pair and force them inwardly always as far as possible and thus take up the slack. In the form shown in Figures 3 and 4, where one pair of pulleys is not positively adjusted, the springs none the less tend always to force the pulleys inwardly toward each other, and thus to take up any slack which may occur.

In transmissions of this general type it is important to have the proper adjustment and to prevent slack. Chains of this type as ordinarily used do not satisfactorily permit much side play, side bending or movement out of alignment and consequently it is important to preserve proper alignment so that irrespective of the various positions of adjustment the chain remains as nearly as possible on the same central line. For that reason, even in the pulleys which are urged inwardly by springs, the arrangement is such as to preserve the balance and alignment and consequently both pulleys of the right hand pair in the two forms of the invention are provided with springs which are of the same size and power and are, therefore, balanced as to their action so that the force urging each pulley toward the center is the same and is balanced at all times. Therefore the springs have no unbalancing effect and cannot move the pulleys out of alignment. Consequently they cause no distortion and put no added side wear or misaligning forces on the chain.

The device of the present invention is so designed as to provide positive drive, up to a desired overload capacity, and to provide a slip drive beyond that. If the force is sufficient on the chain, the springs will permit some slip. This action is not beneficial to the chain but it constitutes a safety feature so that each unit thus in effect becomes its own "safety valve" and slippage will occur when breakage would otherwise have occurred.

I claim:

1. In a variable speed transmission, a driving shaft and a driven shaft, a pair of pulleys slidably mounted on each shaft, and unit means for simultaneously and oppositely adjusting the pulleys of each pair toward and from each other, a flexible transmission member positioned about said pulleys, lying between the pulleys of each pair and engaged by the working faces of said pulleys, one pair of pulleys provided with balanced springs positioned one between each of said pulleys and said unit adjusting means, and effective to force the pulleys of that pair equally toward each other to the limit permitted by said flexible transmission member, said springs carrying the entire axial thrust of said pulleys the springs being effective to maintain the said flexible transmission member on a constant center.

2. In a variable speed transmission, a driving shaft and a driven shaft, a pair of pulleys having inclined working faces and being slidably mounted on each shaft, and unit means for simultaneously and oppositely adjusting the pulleys of each pair toward and from each other, a flexible transmission member positioned about said pulleys, lying between the pulleys of each pair and engaged by the working faces of said pulleys, one pair of pulleys provided with balanced springs positioned one between each of said pulleys and said unit adjusting means, and effective to force the pulleys of that pair equally toward each other to the limit permitted by said flexible transmission member, said springs carrying the entire axial thrust of said pulleys the springs being effective to maintain the said flexible transmission member on a constant center.

3. In a variable speed transmission, a driving shaft and a driven shaft, a pair of pulleys having inclined working faces and being slidably mounted on each shaft, and unit means for simultaneously and oppositely adjusting the pulleys of each pair toward and from each other, a flexible transmission member positioned about said pulleys, lying between the pulleys of each pair and engaged by the working faces of said pulleys, one pair of pulleys provided with balanced springs positioned one between each of said pulleys and said unit adjusting means, and effective to force the pulleys of that pair uniformly and constantly toward each other to the limit permitted by said flexible transmission member, said springs carrying the entire axial thrust of said pulleys the springs being effective to maintain the said flexible transmission member on a constant center.

4. In combination in a variable speed transmission, a driving shaft and a driven shaft, a pair of cooperating, oppositely faced pulleys having inclined working surfaces, slidably mounted on each shaft, a flexible transmission member engaging the pulleys of both pairs and transmitting power from one pair to the other, means for adjusting the relative position of the pulleys of each pair toward and from each other, said means simultaneously and oppositely effective upon each pair, and balanced yielding means effective upon the pulleys of one pair to move them equally toward each other to the maximum limit permitted by said flexible transmission member, whereby the movement of said pulleys towards each other acts to take up slack in said flexible transmission member, said yielding means carrying the entire axial thrust of said pulleys and whereby the said flexible transmission is maintained on a constant center.

5. In combination in a variable speed transmission, a driving shaft and a driven shaft, a pair of cooperating, oppositely faced pulleys having inclined working surfaces, slidably mounted on each shaft, a flexible transmission member engaging the pulleys of both pairs and transmitting power from one pair to the other, means for adjusting the relative position of the pulleys of each pair toward and from each other, said means simultaneously and oppositely effective upon each pair, and balanced, yielding spring means positioned one between each of said pulleys and said unit adjusting means, and effective upon the pulleys of one pair to move them constantly and uniformly toward each other to the maximum limit permitted by said flexible transmission member to maintain said flexible transmission member on a constant center, whereby the movement of said pulleys towards each other acts to take up slack in said flexible transmission member said spring means carrying the entire axial thrust of said pulleys.

6. In a variable speed transmission, a driving shaft and a driven shaft, a pair of pulleys slidably mounted on each shaft, and simultaneous manually controlled balanced means for adjusting the pulleys of one pair toward and the pulleys of the other pair away from each other, a flexible transmission member positioned about said pulleys, lying between the pulleys of each pair and engaged by the working faces of said pulleys, one pair of pulleys provided with balanced springs positioned one between each of said pulleys and said unit adjusting means, and effective to force the pulleys of that pair equally toward each other to the limit permitted by said flexible transmission member.

7. In a variable speed transmission, a driving shaft and a driven shaft, a pair of pulleys slidably mounted on each shaft, and simultaneous balanced lever means for adjusting the pulleys of one pair toward and the pulleys of the other pair away from each other, a flexible transmission member positioned about said pulleys, lying between the pulleys of each pair and engaged by the working faces of said pulleys, one pair of pulleys provided with balanced springs positioned one between each of said pulleys and said unit adjusting means, and effective to force the pulleys of that pair equally toward each other to the limit permitted by said flexible transmission member and to maintain said flexible transmission member on a constant center.

8. In a variable speed transmission, a driving shaft and a driven shaft, a pair of pulleys slidably mounted on each shaft, and simultaneous balanced lever means for adjusting the pulleys of one pair toward and the pulleys of the other pair away from each other, said means supported upon the housing at two diametrically opposite points intermediate the ends of the housing, a flexible transmission member positioned about said pulleys, lying between the pulleys of each pair and engaged by the working faces of said pulleys, one pair of pulleys provided with balanced springs positioned one between each of said pulleys and said unit adjusting means, and effective to force the pulleys of that pair equally toward each other to the limit permitted by said flexible transmission member and to maintain said flexible transmission member on a constant center.

HENRY G. KELLER.